(12) United States Patent
Sandberg (10) Patent No.: US 11,233,573 B2
(45) Date of Patent: Jan. 25, 2022

(54) RADIO UNIT AND RADIO LINK TRANSCEIVER FOR CROSS-POLAR SIGNAL TRANSFER

(71) Applicant: Telefonaktiebolaget LM Ericsson (publ), Stockholm (SE)

(72) Inventor: Jan Sandberg, Frillesås (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/262,391

(22) PCT Filed: Aug. 21, 2018

(86) PCT No.: PCT/EP2018/072503
§ 371 (c)(1),
(2) Date: Jan. 22, 2021

(87) PCT Pub. No.: WO2020/038557
PCT Pub. Date: Feb. 27, 2020

(65) Prior Publication Data
US 2021/0297160 A1    Sep. 23, 2021

(51) Int. Cl.
*H04B 10/40* (2013.01)
(52) U.S. Cl.
CPC .................. *H04B 10/40* (2013.01)
(58) Field of Classification Search
CPC ........... H04B 1/525; H04B 10/40; H04L 5/04; H03B 7/15585
USPC ....................................................... 398/135
See application file for complete search history.

(56) References Cited

U.S. PATENT DOCUMENTS

| 6,782,211 B1* | 8/2004 | Core | H04B 10/69 398/205 |
| 8,396,177 B1* | 3/2013 | Morris | H04B 7/002 375/346 |
| 2003/0161419 A1* | 8/2003 | Bach | H04B 1/525 375/346 |
| 2012/0051756 A1* | 3/2012 | Grobe | H04B 10/5161 398/184 |

(Continued)

FOREIGN PATENT DOCUMENTS

| EP | 1542373 A1 | 6/2005 |
| EP | 2495897 A1 | 9/2012 |
| JP | H09214461 A | 8/1997 |

*Primary Examiner* — Dalzid E Singh
(74) *Attorney, Agent, or Firm* — Coats & Bennett, PLLC (57) ABSTRACT

The present disclosure relates to a radio unit (420, 420A, 420B) adapted for cross-polar signal transfer (230), comprising an optical transmit interface (430, 430A, 430B) and an optical receive interface (440, 440A, 440B) which are arranged to transfer cross-polar signals for cross-polar interference cancellation, XPIC, to and from an external source, respectively. The optical transmit interface (430, 430A, 430B) and the optical receive interface (440, 440A, 440B) are arranged at equal distances (D) from a symmetry line (450) of the interfaces, and in a plane (451) perpendicular to the symmetry line (450). Upon rotation of the radio unit (420, 420A, 420B) about the symmetry line (450) by 180 degrees, the optical transmit interface after rotation aligns with the optical receive interface before rotation, and the optical receive interface after rotation aligns with the optical transmit interface before rotation.

20 Claims, 7 Drawing Sheets

(56) References Cited

U.S. PATENT DOCUMENTS

2014/0113569 A1* 4/2014 Arai ............... H04B 1/126
  455/63.1
2016/0329950 A1* 11/2016 Khlebnikov ........ H04B 7/063
2018/0294826 A1* 10/2018 Fouche ............. H04B 1/123

* cited by examiner

PRIOR ART

RADIO UNIT AND RADIO LINK TRANSCEIVER FOR CROSS-POLAR SIGNAL TRANSFER

TECHNICAL FIELD

The present disclosure relates to point to point radio communication links, such as microwave radio links. There is disclosed herein methods and arrangements for transferring radio signals between a first and a second radio unit.

BACKGROUND

There are dual polarized radio links that transfer two signal streams, one for each polarization, that use cross-polar signals for cross-polar interference cancellation (XPIC). When receiving the two streams there is a residual mutual interference that suitably should be suppressed. The two received polarizations, normally linear horizontal H and vertical V, are routed each to a corresponding transceiver, one for H polarization and one for V polarization.

In order to enable XPIC, there has to be connections between the transceivers, one for H polarization and one for V polarization such that the transceiver for H polarization can compensate for V polarized interference, and such that the transceiver for V polarization can compensate for H polarized interference in a previously well-known manner.

Connections between two transceivers is normally accomplished by means of a multi-signal cable, for example a cable with 4 twisted pairs and relatively small connectors, about 60 cm long. Such cables are difficult to connect and disconnect if there is a need to change or install transceivers, in particular if the work is performed high up in a mast. The cable-based connection also suffers from losses at high frequencies; the signals transferred between the transceivers for XPIC can have a bandwidth of more than 1 GHz.

It is therefore desired to have more reliable connections for signals transferred between the transceivers, which signals are intended for XPIC.

SUMMARY

The object of the present disclosure is to provide more reliable connections for signals transferred between the transceivers, which signals are intended for XPIC.

This object is obtained by means of a radio unit adapted for cross-polar signal transfer, comprising an optical transmit interface which is arranged to transfer cross-polar signals for cross-polar interference cancellation (XPIC) to and from an external source, respectively. The optical transmit interface and the optical receive interface are arranged at equal distances from a symmetry line of the interfaces, and in a plane perpendicular to the symmetry line. In this manner, upon rotation of the radio unit about the symmetry line by 180 degrees, the optical transmit interface after rotation aligns with the optical receive interface before rotation, and the optical receive interface after rotation aligns with the optical transmit interface before rotation.

This enables the radio unit to align with a corresponding radio unit such that optical communication can be established between the radio units when they are mounted facing each other. Having the radio unit adapted for optical communication of cross-polar signals for XPIC dispenses with external expensive cabling and related EMC (Electromagnetic compatibility) issues generated due to the cables, makes installation easier, and simplifies repair of installed equipment.

According to some aspects, the optical transmit interface comprises a light emitting diode (LED) and the optical receive interface comprises a photo detector.

Alternatively, the optical transmit interface comprises a laser emitter, and the optical receive interface comprises a laser detector.

In this manner, optical communication is enabled by means of the optical interfaces using well-known and inexpensive components.

According to some aspects, the optical transmit interface is a differential transmit interface comprising first and second optical transmitters. Correspondingly, the optical receive interface is a differential receive interface comprising first and second optical detectors.

According to some aspects, the optical transmit interface comprises a lens arrangement configured to focus emitted optical signals.

According to some aspects, the optical receive interface comprises a lens arrangement configured to focus received optical signals.

Lens arrangements provides a more reliable optical communication. Lens arrangements may also improve optical communication performance due to an increase in received signal quality.

According to some aspects, the cross-polar signal comprises an analog signal and/or a digital signal. According to some aspects, the cross-polar signal comprises a control signal.

This allows for many types of communication.

According to some aspects, any of the optical transmit interface and the optical receive interface comprises an optical gasket arranged to optically seal a connection involving the optical interface.

This provides a secure seal. The gasket may also shield against interfering light sources, thus improving optical communication conditions over the interface.

This object is also obtained by means of a radio link transceiver comprising a first radio unit according to the above and, a corresponding second radio unit according to the above, as well as a mounting structure. The mounting structure comprises a light guide arrangement arranged to guide light between optical transmit interfaces and respective optical receive interfaces.

In this manner, a reliable optical communication can be established between the radio units. By enabling optical communication of cross-polar signals for XPIC dispenses with external expensive cabling and related EMC issues generated from the cables, makes installation easier, enables easy repair of installed equipment.

According to some aspects, the light guide arrangement comprises machined holes configured to align with an optical transmit interface of the first radio unit on a first side, and with a respective optical receive interface of the second radio unit on a second side.

The machined holes may contribute to a cost-efficient realization of the disclosed technique.

According to some aspects, the light guide arrangement comprises a transparent element configured to guide light from an optical transmit interface of the first radio unit on a first side to a respective optical receive interface of the second radio unit on a second side.

The transparent element may function as a guide to direct the light signals from transmitter to receiver without significant losses.

According to some aspects, the transparent element is a rod arranged to be glued into a machined hole of the mounting structure.

According to some aspects, the light guide arrangement comprises a tube with a reflective inner coating or a light absorbing inner coating.

The above arrangements ensure a reliable and efficient optical communication via the light guide arrangement.

According to some aspects, the mounting structure comprises an orthomode transducer, OMT, arranged to interface with respective antenna interfaces of the first and second radio units, and with an antenna unit.

In this manner, the two orthogonally polarizations can be combined/divided.

This object is also obtained by means of a radio link transceiver comprising a first radio unit and a second radio unit, where each radio unit comprises an optical transmit interface and an optical receive interface. Each optical transmit interface and each optical receive interface is arranged to transfer cross-polar signals for cross-polar interference cancellation (XPIC) The optical transmit interface and the optical receive interface on the first radio unit are arranged according to a mirror image of the optical receive interface and the optical transmit interface, respectively, on the second radio unit. This means that when the first radio unit is aligned with optical interfaces facing optical interfaces of the second radio unit, the optical transmit interface of the first radio unit aligns with the optical receive interface of the second radio unit, and the optical receive interface of the first radio unit aligns with the optical transmit interface of the second radio unit.

In this manner, optical communication can be established between the radio units in a versatile manner. By enabling optical communication of cross-polar signals for XPIC dispenses with external expensive cabling and related EMC issues generated from the cables, makes installation easier, and enables easy repair of installed equipment.

According to some aspects, the radio link transceiver comprises a mounting structure that comprises a light guide arrangement arranged to guide light between optical transmit interfaces and respective optical receive interfaces.

In this manner, a reliable optical communication can be established between the radio units.

Here is also disclosed methods corresponding to the devices according to the above, where these methods display advantages corresponding to the advantages already described in relation to corresponding above-mentioned devices.

BRIEF DESCRIPTION OF THE DRAWINGS

The present disclosure will now be described more in detail with reference to the appended drawings, where.

DETAILED DESCRIPTION

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1:
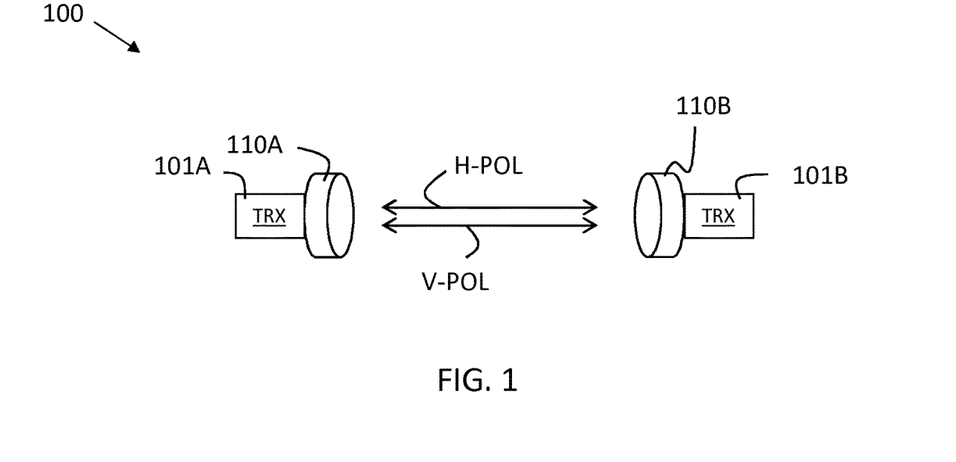
FIG. 1 shows a schematic view of a point to point radio communication link.

With reference to FIG. 1, there is a first point to point radio link 100 that in turn comprises a first antenna 110A, a first radio link transceiver 101A, a second antenna 110B and a second radio link transceiver 101B. The radio link 100 is adapted to communicate via two linear polarizations; a horizontal polarization H-POL and a vertical polarization V-POL, where the polarizations H-POL, V-POL are mutually orthogonal, or at least essentially orthogonal.

Figure 2:
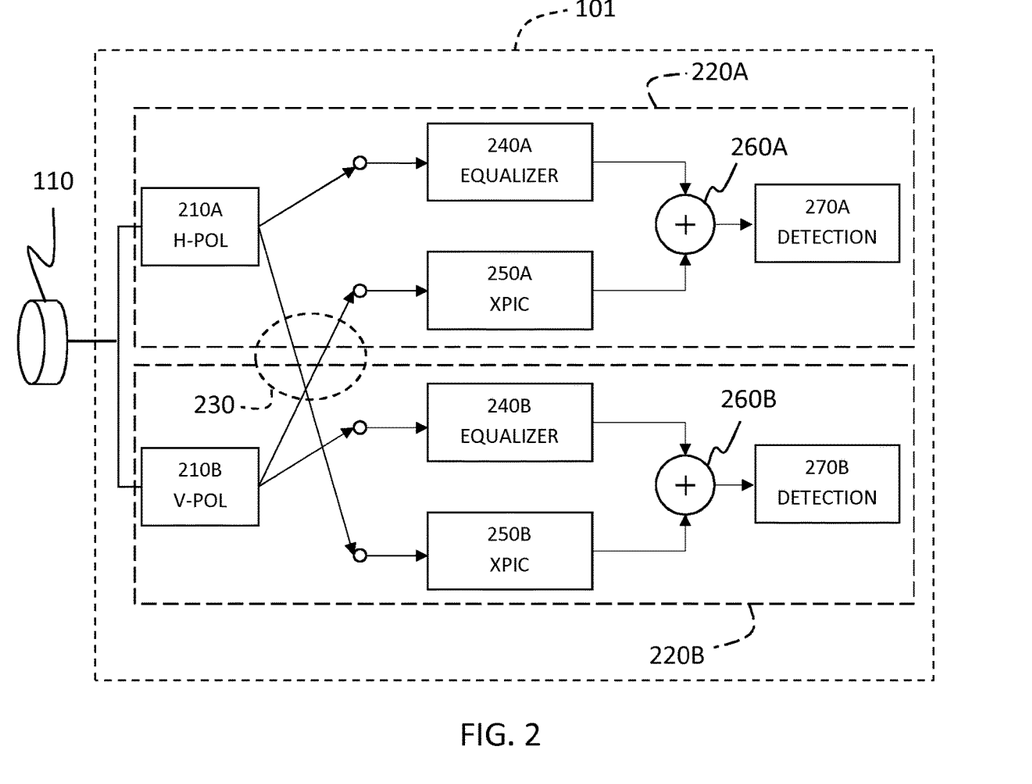
FIG. 2 schematically illustrates an XPIC radio transceiver system.

In the following an antenna 110 and a corresponding radio link transceiver 101 will be described with reference to FIG. 2. The radio link transceiver 101 comprises a first radio unit 220A, intended for horizontal polarization H-POL, and a second radio unit 220B, intended for vertical polarization V-POL. The radio units 220A, 220B comprises a corresponding first transceiver interface 210A and second transceiver interface 210B which are connected to a corresponding first equalizer 240A and second equalizer 240B. The first transceiver interface 210A, comprised in the first radio unit 220A, is furthermore connected to a second cross-polar interference cancellation (XPIC) unit 250B comprised in the second radio unit 220B, and the second transceiver interface 210B, comprised in the second radio unit 220B, is furthermore connected to a first XPIC unit 250A comprised in the first transceiver interface 210A, these connections being adapted for cross-polar signal transfer 230 between the radio units 220A, 220B.

In the first radio unit 220A, the outputs of the first XPIC unit 250A and the first equalizer 240A are connected to a first summing device 260A which in turn is connected to a first detector unit 270A. Correspondingly, in the second radio unit 220B, the outputs of the second XPIC unit 250B and the second equalizer 240B are connected to a second summing device 260B which in turn is connected to a second detector unit 270B.

Cross-polar interference cancellation is achieved by adapting the equalizer and the XPIC unit such that interference cancellation occurs in the summing devices 260A, 260B. Signal processing for cross-polar interference cancellation is known and will not be discussed in detail here.

Figure 3:
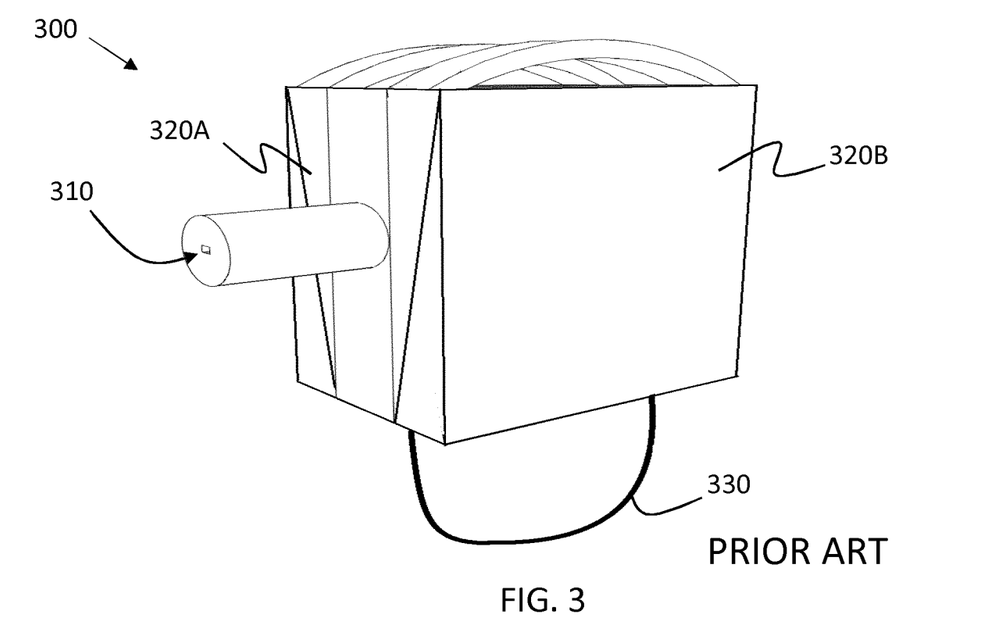
FIG. 3 illustrates an XPIC radio transceiver system according to prior art.

The cross-polar signal transfer 230 has previously been constituted by a multi-signal cable which is associated with a plurality of disadvantages, as described initially. In FIG. 3, a prior art radio link transceiver 300 is shown, having an antenna interface 310 and two radio units 320A, 320B which are connected by a multi-signal cable 330.

Figure 4:
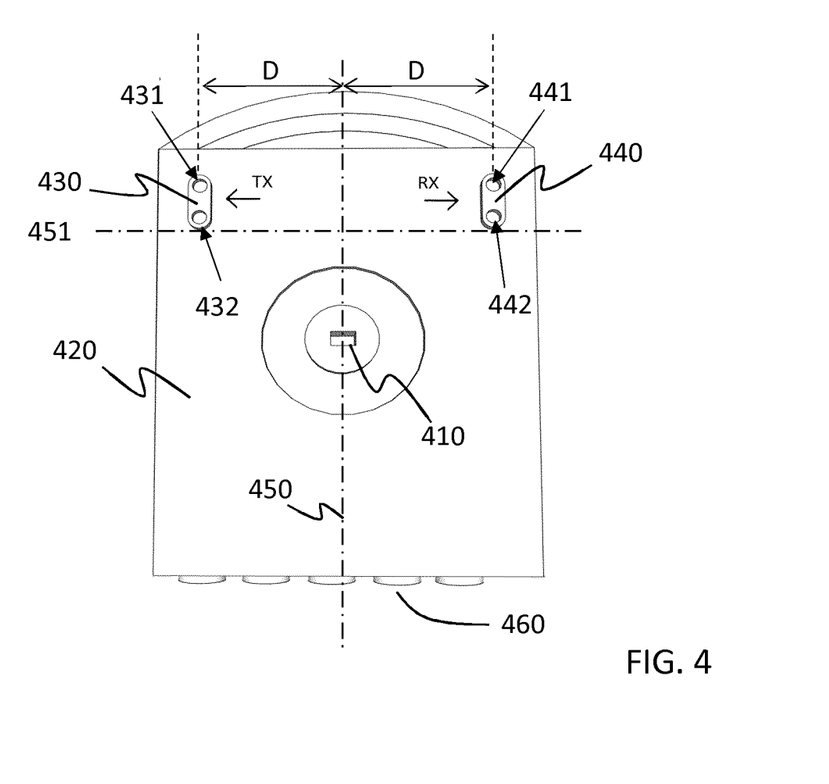
FIG. 4 shows an example radio unit for cross-polar signal transfer.

With reference to FIG. 4 there is a radio unit 420, adapted for cross-polar signal transfer 230 comprising an antenna interface 410 that, for example, is constituted by a waveguide signal interface. The radio unit 420 also comprises additional interfaces, e.g., a power interface and one or more data traffic interfaces arranged on a bottom face 460 of the radio unit 420.

According to the present disclosure, the radio unit 420 comprises an optical transmit interface 430 and an optical receive interface 440, wherein the optical transmit interface 430 and the optical receive interface 440 are arranged to transfer 230 cross-polar signals for XPIC to and from an external source, respectively. The optical transmit interface 430 and the optical receive interface 440 are arranged at equal distances D from a symmetry line 450 of the interfaces, and in a plane 451 perpendicular to the symmetry line 450, such that, upon rotation of the radio unit 420 about the symmetry line 450 by 180 degrees, the optical transmit interface 430 after rotation aligns with the optical receive interface 440 before rotation, and the optical receive interface after rotation aligns with the optical transmit interface before rotation. This means that the optical transmit interface 430 and optical receive interface 440 is adapted to mate with corresponding optical interfaces of an opposing further radio unit when the two radio units are mounted facing each other, as will be described later for a radio link transceiver.

The antenna interface 410 can for example be arranged on the symmetry line 450.

According to some aspects, the optical transmit interface 430 comprises a light emitting diode (LED) and the optical receive interface 440 comprises a photo detector.

According to some aspects, alternatively, the optical transmit interface 430, comprises a laser emitter, and the optical receive interface 440, comprises a laser detector.

According to some aspects, as illustrated in FIG. 4, the optical transmit interface 430 is a differential transmit interface comprising first 431 and second 432 optical transmitters, where furthermore the optical receive interface 440, is a differential receive interface comprising first 441 and second 442 optical detectors.

Figure 5:
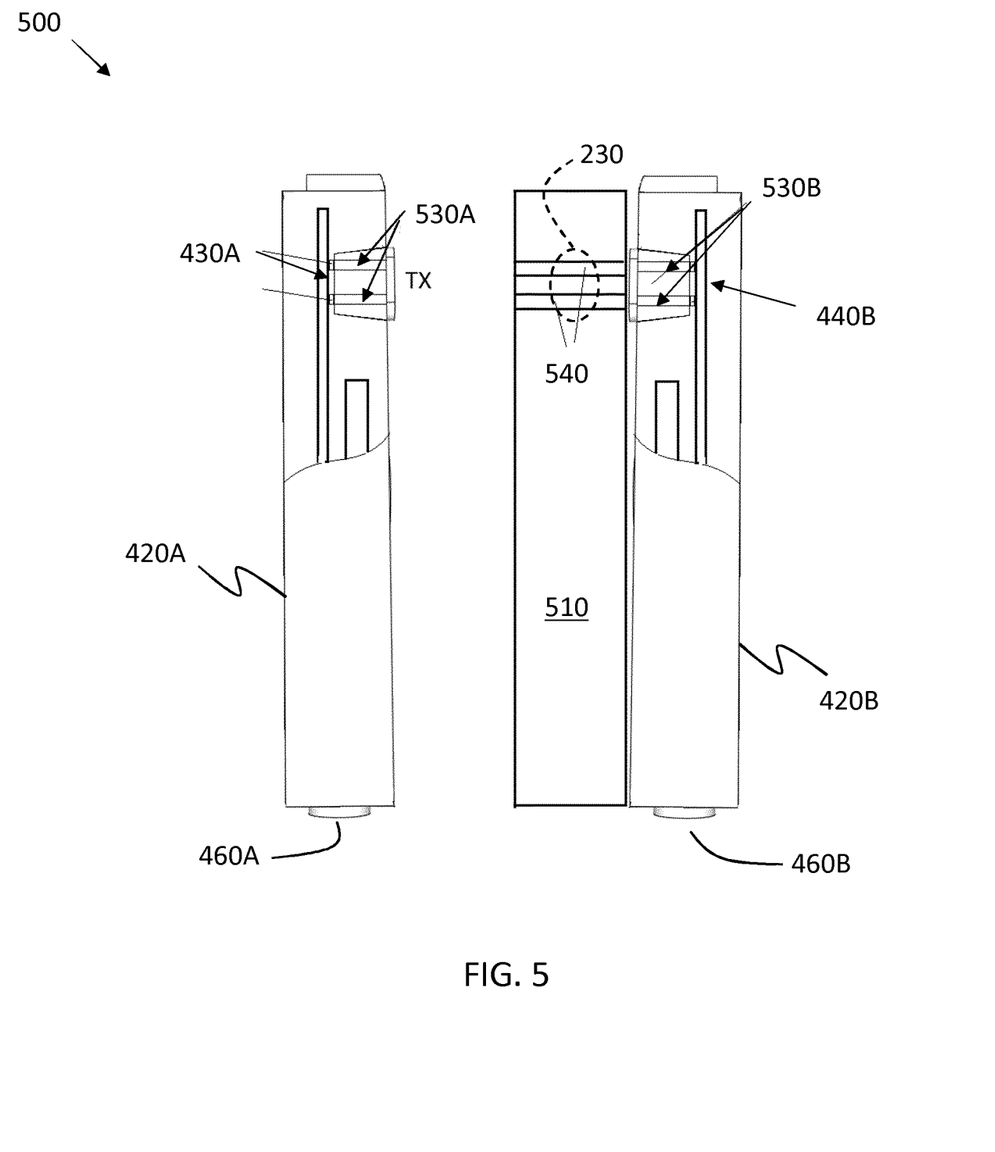
FIGS. 5-7 schematically illustrate XPIC radio transceiver systems.
Figure 6:
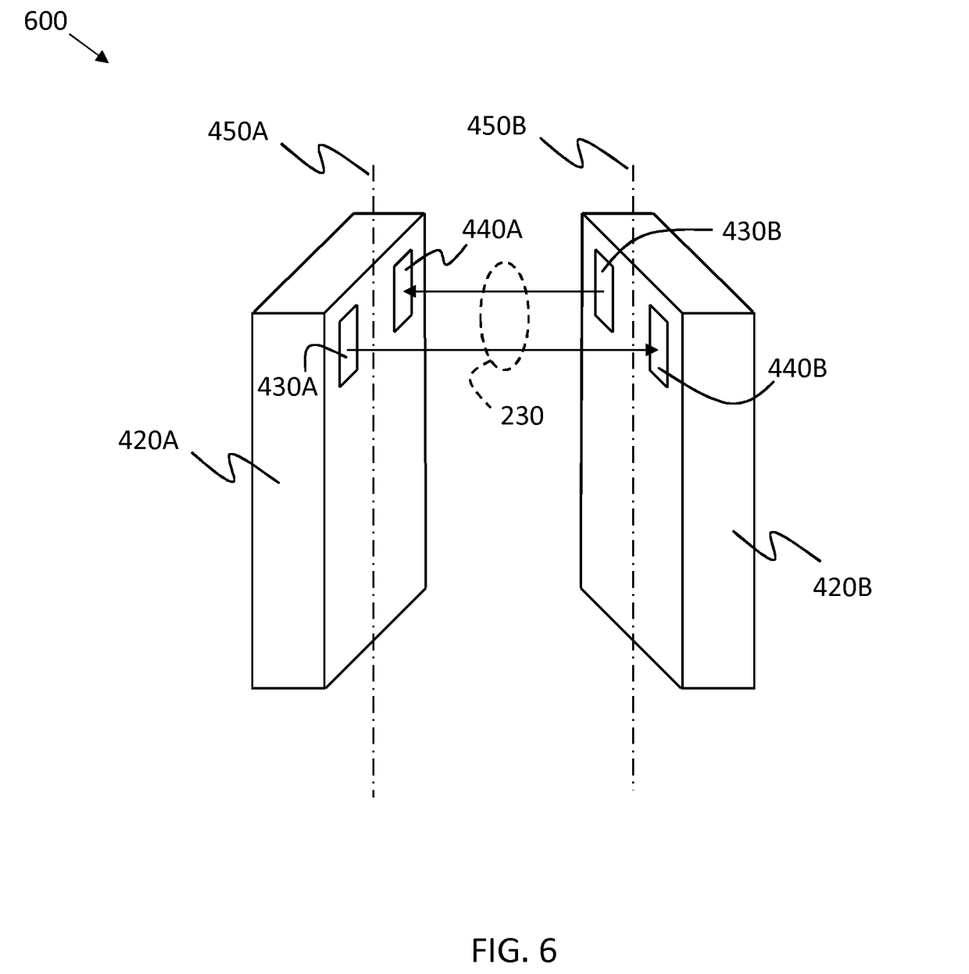

With reference to FIG. 5 and FIG. 6, the present disclosure also relates to a radio link transceiver 500 comprising a first radio unit 420A of the same type as the radio unit 420 described above and a corresponding second radio unit 420B, also of the same kind as the radio unit 420 described above. This means that the radio units 420A, 420B comprise a corresponding first optical transmit interface 430A and second optical transmit interface 430B, corresponding to the optical transmit interface 430 described above, and a first optical receive interface 440A and second optical receive interface 440B corresponding to the optical receive interface 440 described above.

The radio link transceiver 500 further comprises a mounting structure 510, wherein the mounting structure comprises a light guide arrangement 540 arranged to guide light between optical transmit interfaces 430A, 430B and respective optical receive interfaces 440A, 440B. This means that the first optical transmit interface 430A is adapted to mate with the second optical receive interface 440B and that the first optical receive interface 440A is adapted to mate with the second optical transmit interface 430B. The term mating in this context means establishing an optical connection 230, and the optical connection 230 is enabled via the light guide arrangement 540.

According to some aspects, the light guide arrangement 540 comprises machined holes configured to align with an optical transmit interface 530A of the first radio unit 420A on a first side, and with a respective optical receive interface 530B of the second radio unit 420B on a second side.

According to some other aspects, the light guide arrangement 540 comprises a transparent element configured to guide light from an optical transmit interface 530A of the first radio unit 420A on a first side to a respective optical receive interface 530B of the second radio unit 420B on a second side.

The optical transmit interfaces 530A, 530B can for example comprise light guide portions and a contact surface adapted to contact the mounting structure 510.

According to some aspects, the transparent element is a transparent rod arranged to be glued or otherwise assembled into a machined hole in the mounting structure 510.

According to some aspects, the light guide arrangement 540 comprises a tube with a reflective inner coating or a light absorbing inner coating.

According to some aspects, the mounting structure 510 comprises an orthomode transducer (OMT) arranged to interface with respective antenna interfaces 410 of the first and second radio units, and with an antenna unit 110.

Figure 7:
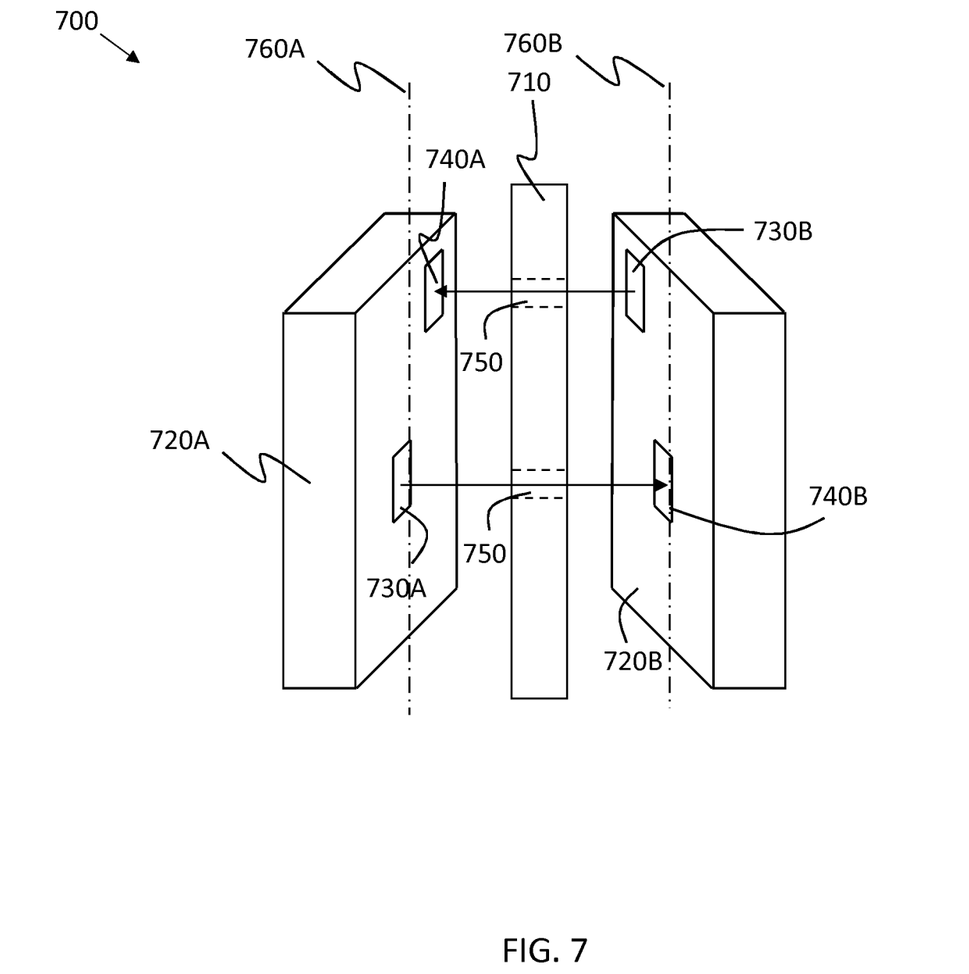

An more general and asymmetrical approach is disclosed in FIG. 7, where a radio link transceiver 700 comprises a first radio unit 720A and a second radio unit 720B, where each radio unit 720A, 720B comprises an optical transmit interface 730A, 730B and an optical receive interface 740A, 740B. The first radio unit 720A comprises a first optical transmit interface 730A and a first optical receive interface 740A, while the second radio unit 720B comprises a second optical transmit interface 730B and a second optical receive interface 740B.

Each optical transmit interface 730A, 730B and each optical receive interface 740A, 740B is arranged to transfer cross-polar signals for cross-polar interference cancellation (XPIC). The first optical transmit interface 730A and the first optical receive interface 740A are arranged on the first radio unit 720A according to a mirror image of the second optical receive interface 740B and the optical transmit interface 730B, respectively, on the second radio unit 720B.

In this manner, when the first radio unit 720A is aligned with the first optical interfaces 730A, 740A facing the second optical interfaces 730B, 740B of the second radio unit 720B, the first optical transmit interface 730A of the first radio unit 720A aligns with the second optical receive interface 740B of the second radio unit 720B. Correspondingly, the first optical receive interface 740A of the first radio unit 720A aligns with the second optical transmit interface 730B of the second radio unit 720B.

According to some aspects, the radio link transceiver 700 comprises a mounting structure 710, the mounting structure comprising a light guide arrangement 750 arranged to guide light between optical transmit interfaces 730A, 730B and respective optical receive interfaces 740A, 740B.

The optical interfaces 730A, 730B; 740A, 740B are according to some aspects of the same or similar design as the optical interfaces 430A, 430B; 440A, 440B described previously, and according to some aspects the mounting structure 710 is of the same or similar design as the mounting structure 510 described previously.

Figure 8A:
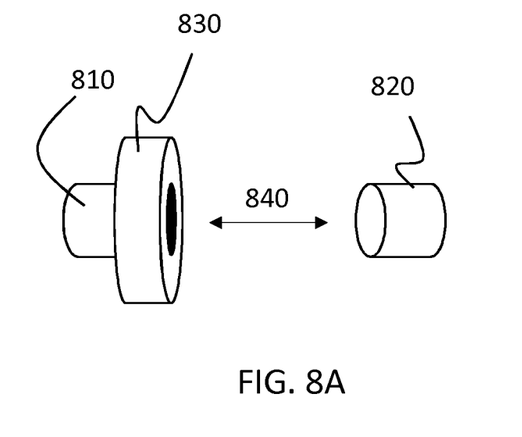
FIG. 8A illustrates an example optical gasket.

According to some aspects, any of the optical transmit interfaces 430; 430A, 430B; 730A, 740A, 810 and the optical receive interfaces 440; 440A, 440B; 740A, 740B, 820 comprises an optical gasket 830 arranged to optically seal a connection involving the optical interface. One example of such a gasket is illustrated in FIG. 8A. The optical gasket 830 encompasses the connection between optical transmit interface and optical receive interface, thereby sealing the connection. The seal may provide protection from other light sources which may interfere with the optical communication 840 and may also according to some aspects provide protection from unwanted moisture and dirt. The gasket may for example be a rubber gasket, such as an o-ring gasket.

Figure 8B:
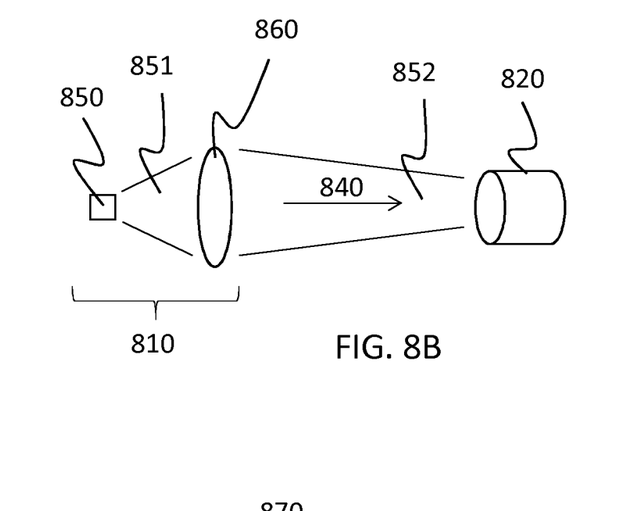
FIGS. 8B-8C schematically illustrate lens arrangements.
Figure 8C:
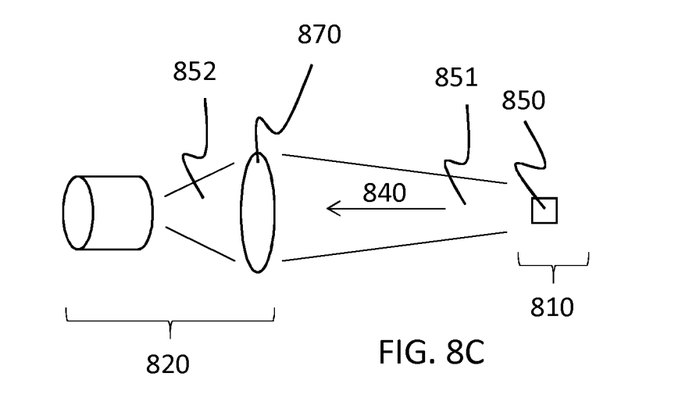

With reference to FIGS. 8B and 8C, according to some aspects, the optical transmit interface 810 comprises a lens arrangement 860 configured to focus optical signals 851, 852 emitted from a light source 850 comprised in an optical transmit arrangement. The optical receive interface 820 may also comprise a lens arrangement 870 configured to focus received optical signals 851,852. It is appreciated that any of the interfaces may comprise a lens, i.e., a lens may be arranged on the transmit side only as illustrated in FIG. 8B, on the receive side only as illustrated in FIG. 8C, or on both transmit and receive sides (not shown).

Figure 9:
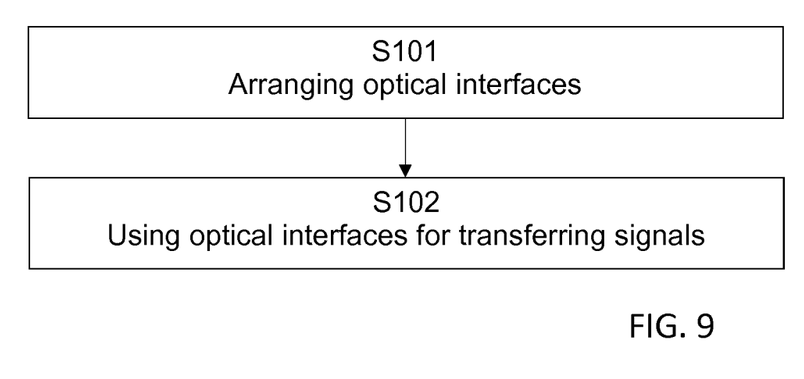
FIG. 9-11 are flowcharts illustrating methods.

With reference to FIG. 9, the present disclosure also relates to method in a radio unit 420, 420A, 420B, where the method comprises: arranging S101 an optical transmit interface 430, 430A, 430B and an optical receive interface 440, 440A, 440B at equal distances D from a symmetry line 450 of the interfaces, and in a plane 451 perpendicular to the symmetry line 450, such that, upon rotation of the radio unit 420, 420A, 420B about the symmetry line 450 by 180 degrees, the optical transmit interface after rotation aligns with the optical receive interface before rotation, and the optical receive interface after rotation aligns with the optical transmit interface before rotation; and using S102 the optical transmit interface 430, 430A, 430B and the optical receive interface 440, 440A, 440B are for transferring cross-polar signals for cross-polar interference cancellation, XPIC, to and from an external source, respectively.

Figure 10:
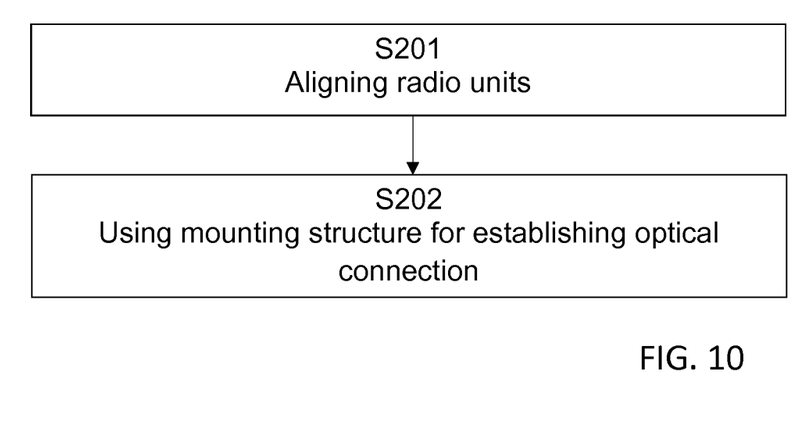

With reference to FIG. 10, the present disclosure also relates to method in a radio link transceiver 500, where the method comprises:

aligning S201 a first radio unit 420A with a corresponding second radio unit 420B such that the optical interfaces 430A, 430B; 440A, 440B according to claim 20 are aligned between the radio units 420A, 420B such that the first optical transmit interface 430A is aligned with the second optical receive interface 440B and that the first optical receive interface 440A is aligned with the second optical transmit interface 430B; and using S202 an intermediate mounting structure 510 for establishing optical connection 230.

Figure 11:
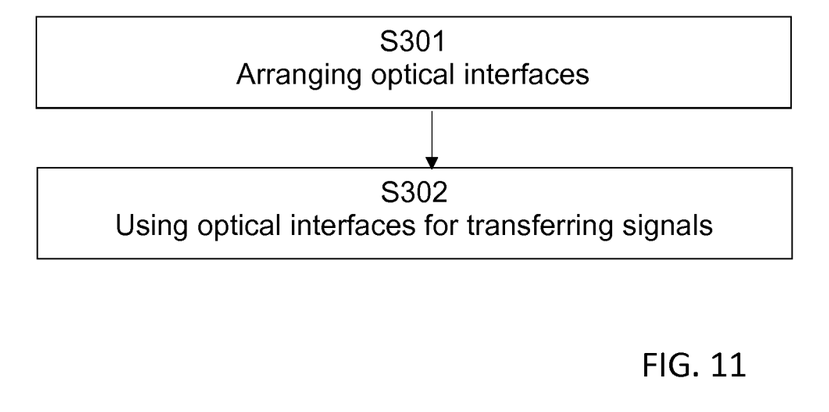

With reference to FIG. 11, the present disclosure also relates to method in a radio link transceiver 700, where the method comprises:

arranging S301 an optical transmit interface 730A and an optical receive interface 740A on a first radio unit 720A according to a mirror image of an optical receive interface 740B and an optical transmit interface 730B, respectively, on a second radio unit 720B, such that, when the first radio unit 720A is aligned with optical interfaces 730A, 740A facing optical interfaces 730B, 740B of the second radio unit 720B, the optical transmit interface 730A of the first radio unit 720A aligns with the optical receive interface 740B of the second radio unit 720B, and the optical receive interface 740A of the first radio unit 720A aligns with the optical transmit interface 730B of the second radio unit 720B; and using S302 each optical transmit interface 730A, 730B and each optical receive interface 740A, 740B for transferring cross-polar signals for cross-polar interference cancellation, XPIC, between the radio units 720A, 720B.

According to some aspects, the method comprises using a light guide arrangement 750 of a mounting structure 710 for guiding light between optical transmit interfaces 730A, 730B and respective optical receive interfaces 740A, 740B.

The present disclosure is not limited to the examples described above, but may vary freely within the scope of the appended claims. For example, the cross-polar signal comprises an analog signal and/or a digital signal.

According to some aspects, the cross-polar signal comprises a control signal.

The invention claimed is:

1. A radio unit adapted for cross-polar signal transfer, comprising:

an optical transmit interface and an optical receive interface, wherein the optical transmit interface and the optical receive interface are arranged to transfer cross-polar signals for cross-polar interference cancellation (XPIC) to and from an external source, respectively;

wherein the optical transmit interface and the optical receive interface are arranged at equal distances from a symmetry line of the interfaces, and in a plane perpendicular to the symmetry line, such that, upon rotation of the radio unit about the symmetry line by 180 degrees:

the optical transmit interface after rotation aligns with the optical receive interface before rotation; and the optical receive interface after rotation aligns with the optical transmit interface before rotation.

2. The radio unit of claim 1, wherein the optical transmit interface comprises a light emitting diode, and wherein the optical receive interface comprises a photo detector.

3. The radio unit of claim 1, wherein the optical transmit interface comprises a laser emitter; and wherein the optical receive interface comprises a laser detector.

4. The radio unit of claim 1, wherein the optical transmit interface is a differential transmit interface comprising first and second optical transmitters; and wherein the optical receive interface is a differential receive interface comprising first and second optical detectors.

5. The radio unit of claim 1, wherein the optical transmit interface comprises a lens arrangement configured to focus emitted optical signals.

6. The radio unit of claim 1, wherein the optical receive interface comprises a lens arrangement configured to focus received optical signals.

7. The radio unit of claim 1, further comprising an antenna interface arranged on the symmetry line.

8. The radio unit of claim 1, wherein the cross-polar signal comprises an analog signal.

9. The radio unit of claim 1, wherein the cross-polar signal comprises a digital signal.

10. The radio unit of claim 1, wherein the cross-polar signal comprises a control signal.

11. The radio unit of claim 1, wherein the optical transmit interface and/or the optical receive interface comprises an optical gasket arranged to optically seal a connection involving the optical interface.

12. A radio link transceiver, comprising:

a first radio unit according to claim 1;

a corresponding second radio unit according to claim 1; and a mounting structure, wherein the mounting structure comprises a light guide arrangement arranged to guide light between optical transmit interfaces and respective optical receive interfaces.

13. The radio link transceiver of claim 12, wherein the light guide arrangement comprises machined holes configured to align with an optical transmit interface of the first radio unit on a first side, and with a respective optical receive interface of the second radio unit on a second side.

14. The radio link transceiver of claim 12, wherein the light guide arrangement comprises a transparent element configured to guide light from an optical transmit interface of the first radio unit on a first side to a respective optical receive interface of the second radio unit on a second side.

15. The radio link transceiver of claim 14, wherein the transparent element is a transparent rod configured to be glued into a machined hole of the mounting structure.

16. The radio link transceiver of claim 12, wherein the light guide arrangement comprises a tube with a reflective inner coating or a light absorbing inner coating.

17. The radio link transceiver of claim 12, wherein the mounting structure comprises an orthomode transducer arranged to interface with respective antenna interfaces of the first and second radio units, and with an antenna unit.

18. A method in a radio unit, comprising:
arranging an optical transmit interface and an optical receive interface at equal distances from a symmetry line of the interfaces, and in a plane perpendicular to the symmetry line, such that, upon rotation of the radio unit about the symmetry line by 180 degrees:
the optical transmit interface after rotation aligns with the optical receive interface before rotation; and
the optical receive interface after rotation aligns with the optical transmit interface before rotation; and
using the optical transmit interface and the optical receive interface for transferring cross-polar signals for cross-polar interference cancellation (XPIC) to and from an external source, respectively.

19. A method in a radio link transceiver, comprising:
arranging an optical transmit interface and an optical receive interface on a first radio unit mirror image an optical receive interface and an optical transmit interface, respectively, on a second radio unit, such that, when the first radio unit is aligned with optical interfaces facing optical interfaces of the second radio unit:
the optical transmit interface of the first radio unit aligns with the optical receive interface of the second radio unit; and
the optical receive interface of the first radio unit aligns with the optical transmit interface of the second radio unit; and
using each optical transmit interface and each optical receive interface for transferring cross-polar signals for cross-polar interference cancellation (XPIC) between the radio units.

20. The method of claim 19, wherein the method comprises using a light guide arrangement of a mounting structure for guiding light between optical transmit interfaces and respective optical receive interfaces.

* * * * *